Dec. 29, 1964  H. KARLBY ETAL  3,163,041
METER DRIVE
Filed Jan. 17, 1957  6 Sheets-Sheet 1
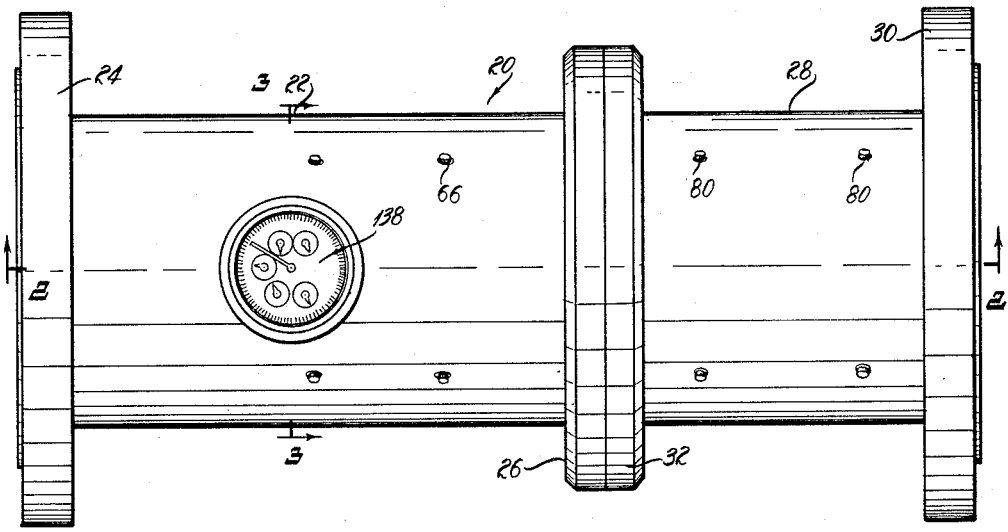
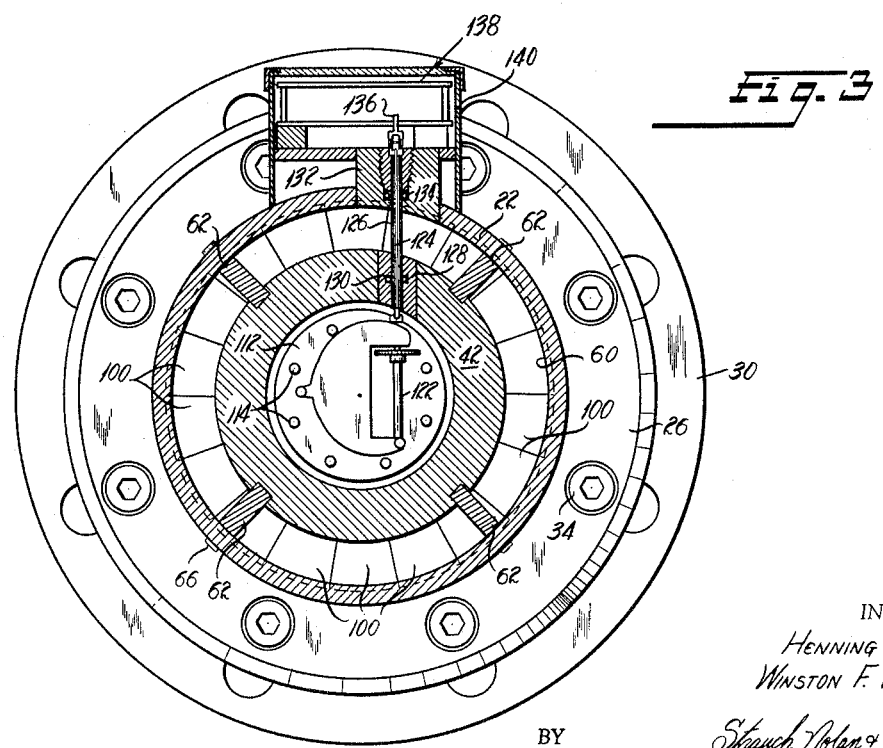
INVENTORS
HENNING KARLBY
WINSTON F. Z. LEE
BY
ATTORNEYS

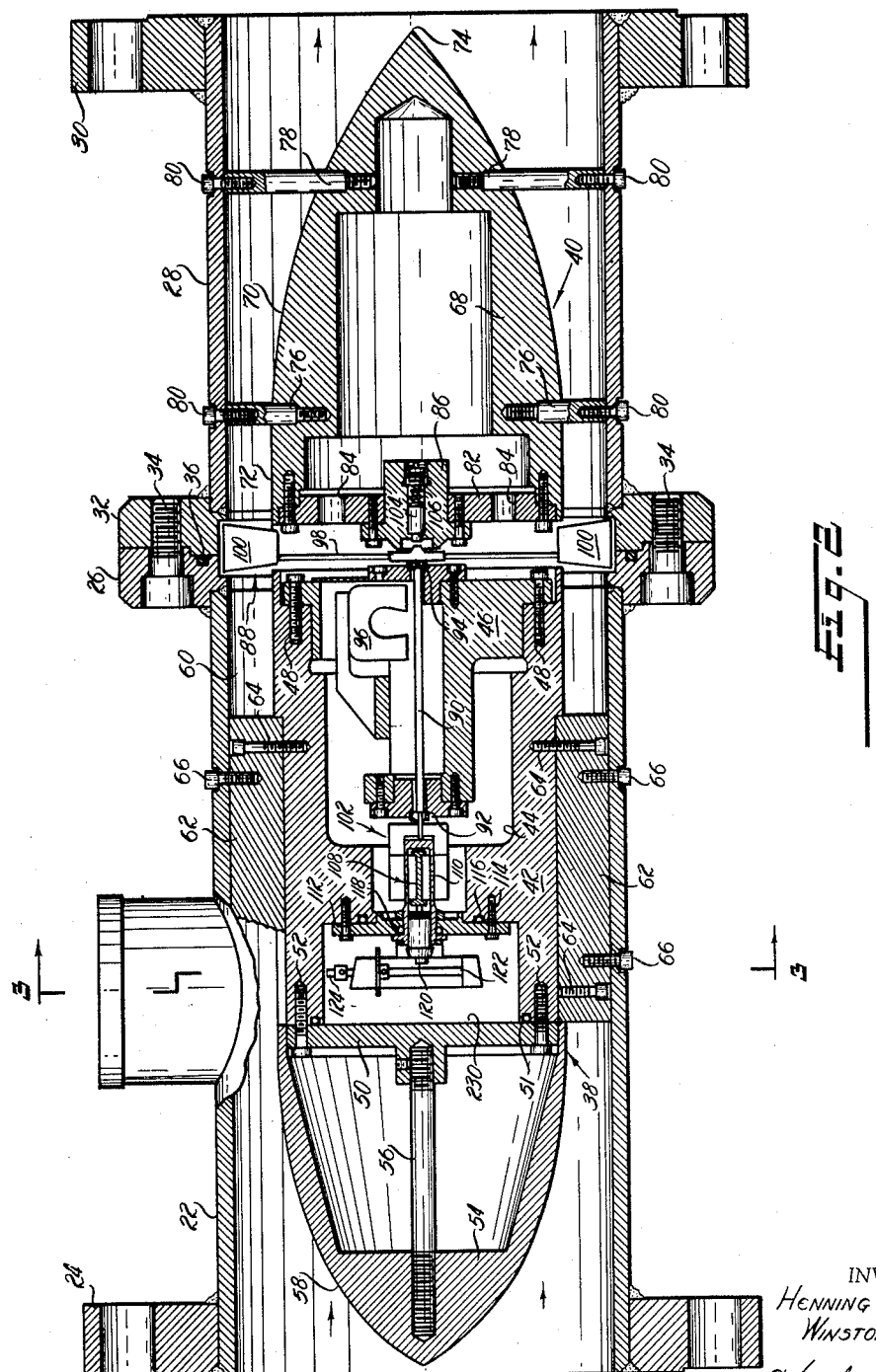

Dec. 29, 1964   H. KARLBY ETAL   3,163,041
METER DRIVE
Filed Jan. 17, 1957   6 Sheets-Sheet 3

INVENTORS
HENNING KARLBY
WINSTON F.Z. LEE

BY

ATTORNEYS

INVENTORS
HENNING KARLBY
WINSTON F. Z. LEE

BY Strauch, Nolan & Neale

ATTORNEYS

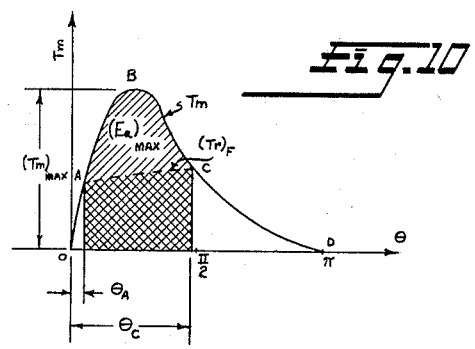
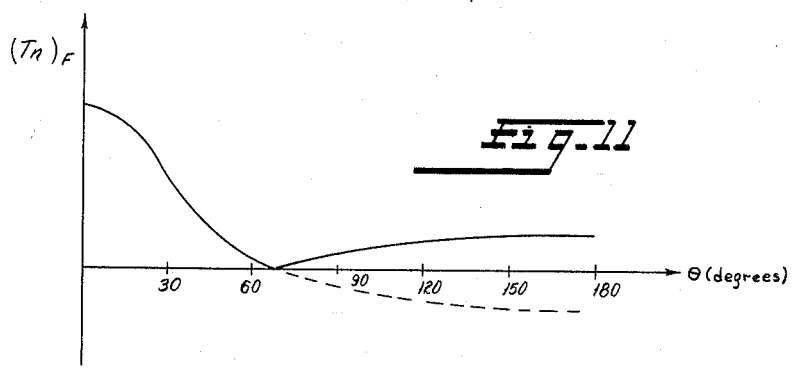
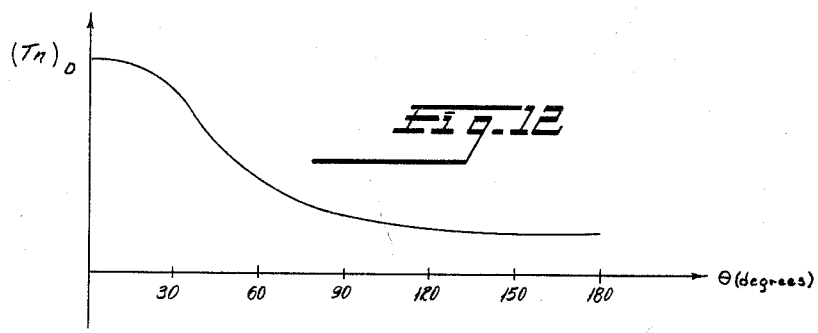

Dec. 29, 1964   H. KARLBY ETAL   3,163,041
METER DRIVE
Filed Jan. 17, 1957
6 Sheets-Sheet 6
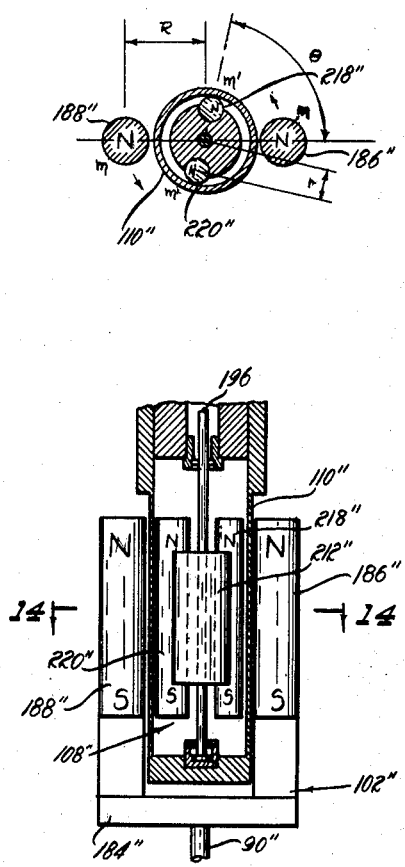
Fig.14
Fig.13
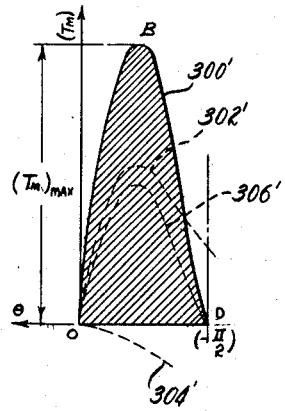
Fig.15
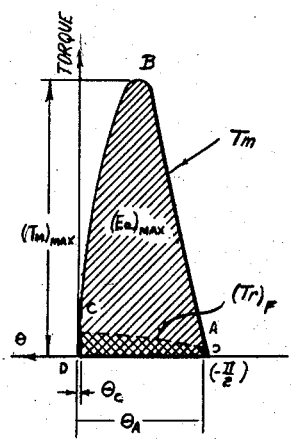
Fig.16
INVENTORS
HENNING KARLBY
WINSTON F.Z. LEE
BY
Strauch, Nolan & Neale
ATTORNEYS

United States Patent Office 3,163,041
Patented Dec. 29, 1964

3,163,041
METER DRIVE
Henning Karlby and Winston F. Z. Lee, Pittsburgh, Pa., assignors to Rockwell Manufacturing Company, Pittsburgh, Pa., a corporation of Pennsylvania
Filed Jan. 17, 1957, Ser. No. 634,662
13 Claims. (Cl. 73—231)

The present invention relates to improvements in drive couplings for use primarily in measuring instruments and more particularly to improvements in the drive trains interconnecting the metering element with the registering mechanism of meters.

One of the most important problems that existed, for example, in direct registering fluid meters was the provision of a drive connection between a moving fluid flow metering element disposed within a compartment or passage into which the fluid to be metered was introduced and an external register while maintaining the fluid tight integrity of the compartment or passage. For many years a mechanical connection such as a shaft extending through a dynamic seal such as a stuffing box was the only solution to this problem. This solution, while the best then available, was not particularly satisfactory due to deterioration of the seal and high friction torque created by the seal. In recent years this particular sealing problem has been effectively solved by the use of a magnetic coupling. Such couplings permit the use of a non magnetic partition which forms a fixed static fluid tight seal between the metering element and the register through which the coupling elements are drive connected by magnetic flux. Bergman Patent Number 2,487,783 issued November 15, 1949 for Magnetic Drive and copending application Serial Number 276,652 filed March 14, 1952 now Patent No. 2,858,461 for Meter Registers and Drive Mechanisms Therefor illustrate examples of such a solution to the sealing problem in water meters.

While magnetic couplings effectively solve the sealing problem, they introduce additional problems which are varying degrees of relative importance depending upon the type of meter in which they are used.

Basically there are three distinct ways of hydromechanically measuring the quantity of fluid passed by a pipe;

(a) By counting "BUCKET FULLS" in which the buckets are alternately filled and drained through valves (the positive displacement diaphragm gas meter and oscillating piston or nutating disc type water meters are examples of commercial forms of this type of meter);

(b) By counting the length of the fluid stream itself (the turbine meter disclosed in this application is illustrative of this type of meter), and (c) By measuring the velocity of the stream and integrating over a timed interval (the industrial orifice meter is illustrative of this type).

These three types of meters have widely differing characteristics and, depending upon their characteristics, find different commercial applications. The most important of these characteristics are absolute flow, flow ratio (the ratio of the maximum quantity of flow to the minimum of quantity of flow which may be metered accurately), the line pressure and the nature of the liquid.

The "Bucket Meters" must necessarily be bulky for a given flow because the buckets are operative half of the time only and, being bulky, pressure retention becomes a structural problem while the valves required permit the passage of "clean" fluids only. The main advantage of this type of meter is its high flow ratio because of its relatively positive action. These meters are useful in the field of low flow at low pressure.

The stream length meters are compact and are suited for high line pressures and relatively dirty fluids. Their flow ratio is intermediate the bucket meters and the velocity meters.

The velocity meters are the most compact of all as their primary element consists of a pipe constriction only. They will handle any pressure and liquid which the pipe itself will handle. In all practical forms, the velocity is inferred from the differential head across the constriction which in all practical cases is proportional to the velocity squared which makes the sensitivity nearly proportional to velocity or at low velocity the sensitivity is low. This in practice restricts the flow ratio to small values, usually less than 5. The velocity meter requires an integrator in order to become a quantity meter. These meters are good for higher line pressures, pressure compensated, able to handle any pipe line fluid but have an extremely limited flow ratio, mostly of the order of 3 or 4 only, that is, the smallest flow that can be integrated with acceptable accuracy is of the order of one-quarter the full flow or higher.

The stream length or turbine meter has a basic advantage over the bucket meters in that for any given quantity of flow it is much more compact than the corresponding size bucket meter. The basic advantages of the stream length meter over the orifice meter are its much greater flow ratio and its direct indication of total quantity of fluid passed without integration.

Magnetic couplings through static fluid seals to interconnect the metering element with the registering mechanism are applicable to both the bucket meter and the stream length meters. However, the requirements of magnetic coupling is much more strict when used on stream length meters than on bucket meters because of the following reasons. Whatever design the magnetic coupling may be, it will in itself always introduce certain extra load on the fluid metering element which will be henceforth called "backload" of the magnetic coupling. Because of its less positive action, the stream length or turbine meter can tolerate considerably less backload from the magnetic coupling than a bucket or positive displacement meter of equivalent capacity without resulting in excessive inaccuracy at low flow. In order to obtain high degree of accuracy over a large flow range, the backload of the magnetic coupling has to be very small. Also, the maximum operating speed of turbine meter is considerably higher than that of positive displacement meter. Consequently, the driver magnets (connected to the metering element) of a magnetic coupling should be able to pick up the follower magnets (connected to the register mechanism) from rest at a considerably higher speed than that required in the case of a positive displacement meter. High pickup speed necessitates a low moment of inertia of the follower system or high accelerating torque or both. Therefore the backload, the magnetic driving torque and the moment of inertia of the magnetic coupling are much more critical in a turbine meter than in a positive displacement meter. A magnetic coupling satisfactory for a positive displacement meter might prove to be far from tolerable when used in turbine meter.

While, as is pointed out above, the magnetic couplings for fluid meters as heretofore designed did solve the fluid sealing problem, they do exert an additional backload upon the metering element, increase the moment of inertia of the drive, and create a problem of high speed pick up due to the inherent lag in any non positive coupling such as a magnetic coupling. While the magnetic couplings as heretofore designed as illustrated in the aforesaid Bergman patent and co-pending application have proved extremely satisfactory for use in positive displacement type water meters, due to their high backload upon the metering element and low magnetic driving torque for a given moment of inertia of the drive they are not suitable for use in turbine meters.

The design of a magnetically coupled registered drive train involves four basic factors:

(1) The strength of the magnetic coupling must be sufficient to maintain the drive connection at the maximum angular velocity of the coupling;

(2) The drive coupling must be of sufficient strength and so designed that the coupling will be maintained for the maximum magnitude of acceleration and deceleration to which the coupling is subjected by the meter;

(3) The moment of inertia of the components of the magnetic coupling and the entire drive train should be as small as practical for a given value of maximum magnetic driving torque; and (4) The backload upon the metering element should be held to a minimum consistent with the type of meter in which it is being used and the other three factors.

In all magnetic couplings heretofore designed with which we are familiar, the magnetic coupling force between the driving and driven elements of the magnetic coupling produced an increased loading upon the bearings of both the driving and driven elements which produces an increased load upon the metering element. In the aforesaid Bergman patent for example, this increased load is caused by the radial component of the magnetic coupling force and in others such as in Weisse Patent 2,354,563 issued July 25, 1944 for Magnetic Drive, it is caused by the axial component of the magnetic coupling force.

These magnetically induced loads upon the metering element due to the magnetic coupling force have to be overcome by additional driving torque of the fluid, which is created by additional slippage of the metering element relative to the fluid, resulting in loss of meter registration. Beacuse of low fluid driving torque at low flow, this loss of meter registration caused by the backload of a magnetic coupling would show a large percentage error at low flow rates, particulary in turbine meter where fluid driving torque per unit slippage is not large. Also these magnetically induced loads upon bearings of the driven members of the magnetic coupling decreases the useful drive torque available for accelerating the follower system which in turn reduces the maximum pickup speed of the magnetic coupling. In order to accommodate any given maximum pickup speed or useful drive torque requirement, the components of such coupling must be larger and produce a stronger magnetic coupling force than would otherwise be necessary. This results in increased moment of inertia of the input and output members and still additional magnetically induced bearing loads.

The present invention provides a highly efficient magnetic coupling for register drive trains which for a given magnetic driving torque has a low moment of inertia and low backload upon the metering element, and high pickup speed.

With the foregoing general considerations in view, it is a primary object of the present invention to provide an improved magnetically coupled fluid meter register drive train characterized by low backload upon the fluid metering element and high pickup speed of the drive under rapid acceleration.

More specifically it is an object of the present invention to provide an improved magnetically coupled fluid meter register drive train embodying;

(1) An efficient magnetic coupling substantially free of magnetically induced bearing loads.

(2) A magnetic coupling utilizing input and output magnetic members mounted to revolve in concentric paths and which is substantially free of axial and radial loads on the journals thereof induced by the magnetic coupling forces between such members.

(3) A magnetic coupling utilizing dynamically balanced magnetically coupled input and output members mounted for movement in concentric paths and which is substantially free of axial thrust loads on the journals of either of load members due to the magnetic coupling therebetween.

(4) A magnetic coupling formed by a plurality of symmetrically disposed magnets mounted for movement in an outer annular path and a like plurality of symmetrically disposed magnets independently mounted for movement on an inner annular path and in which said magnets are so arranged and of such strength that any radial and axial components of the magnetic coupling force between any of the first said plurality of magnets and any of the second said plurality of magnets is substantially counterbalanced by the radial and axial components of the magnetic coupling force between the others of said pluralities of magnets.

(5) A dynamically and magnetically balanced coupling.

(6) A magnetic coupling embodying a magnetic driving member and a similarly polarized driven member repelled by the driving member during drive of the coupling.

(7) A magnetic coupling having driving and driven magnetic members mounted for movement in concentric paths such that the fields of such magnets are effective to establish a magnetic coupling force therebetween and means for establishing a counterbalancing magnetic force effective to maintain the supports substantially free of any load induced by the magnetic coupling force between such members.

(8) A magnetic coupling and a magnetic suspension independent of the coupling for suspending the metering element, input coupling element and interconnecting drive, whereby the effective weights of the metering element input coupling element and interconnecting drive are substantially reduced to zero.

These and other objects of the present invention will become more fully apparent by reference to the appended claims and as the following detailed description proceeds in reference to the accompanying drawings wherein:

FIGURE 1 is a top plan view of a meter embodying the present invention;

FIGURE 2 is a sectional view taken substantially along the line 2—2 of FIGURE 1;

FIGURE 3 is a sectional view taken substantially along the line 3—3 of FIGURE 1;

Figure 7:
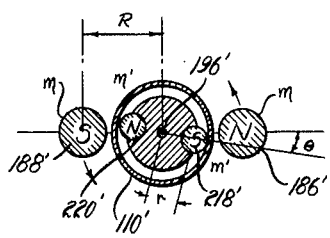
FIGURE 7 is a sectional view of the magnetic drive coupling of FIGURE 6 taken substantially along the line 7—7 of FIGURE 6.
Figure 8:
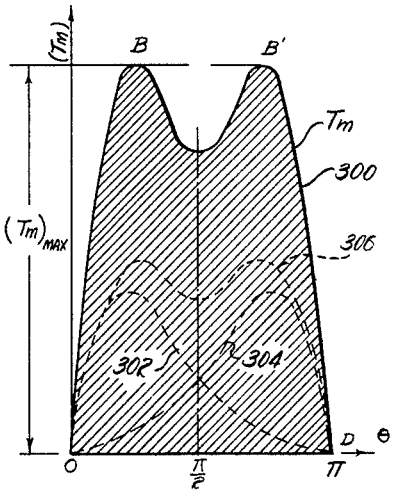
Figure 6:
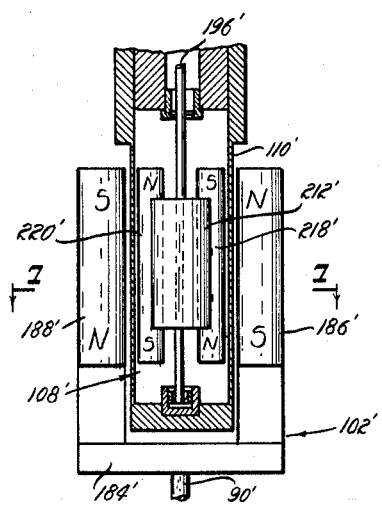
FIGURE 6 is a partially sectioned view of one form of magnetic drive utilized in the present invention.
Figure 9:
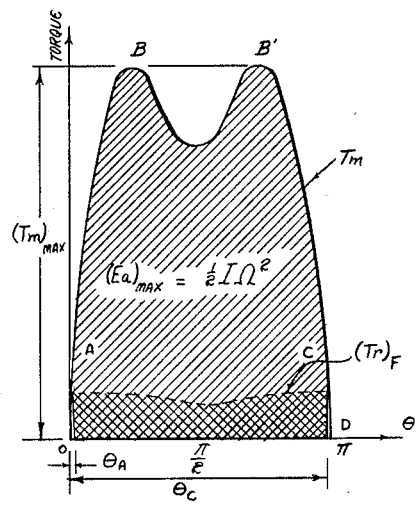

FIGURE 8 is a plot of the relation between the theoretical magnetic driving torque and the angular displacement between the driver and follower of the mechanism illustrated in FIGURES 6 and 7 and illustrates the constituent torques which form such theoretical resultant torque. FIGURE 9 illustrates the relationship between the maximum value of the theoretical total magnetic potential energy available, the energy utilized in overcoming resisting torque, and the energy available during pickup for conversion into kinetic energy of the follower magnet assembly in the drive of FIGURES 6 and 7.

FIGURE 10 is a plot similar to FIGURE 9 for the drive utilizing but a single driver and a single follower magnet as in the aforesaid Bergman patent;

FIGURE 11 is a plot of the relation between the resisting torque due to unbalanced radial component of the magnetic coupling forces acting upon the follower magnets by the driver magnets and the angular displacement between the driver and follower.

FIGURE 12 is a similar plot as FIGURE 11 except the resisting torque due to radial component of the magnetic coupling forces is that acts on the driver magnets by the follower magnets.

FIGURE 13 is a partially sectioned view of a second form of magnetic drive coupling constituting an alternate embodiment of the present invention;

FIGURE 14 is a sectional view taken substantially along the line 14—14 of FIGURE 13;

FIGURE 15 is a plot similar to FIGURE 8 for the drive of FIGURES 13 and 14; and

FIGURE 16 is a plot similar to FIGURE 9 for the drive coupling of FIGURES 13 and 14.

For purposes of illustrating a practical application of the present invention, the register drive train of the present invention is illustrated in FIGURES 1 to 5 as embodied in a turbine type fluid meter 20. Referring to FIGURES 1, 2 and 3, the turbine meter 20 is provided with a separable two part housing comprising a first tubular section 22 having an attachment pipe flange 24 welded to its outer end, and a coupling flange 26 welded thereto at its inner end, a second tubular member 28 of equal diameter to tubular member 22 and coaxially aligned therewith and having a pipe attachment flange 30 welded to its outer end and a flange 32 welded to its inner end and in abutment with the flange 26 of member 22. As is clearly illustrated in FIGURE 2, the flanges 26 and 32 are piloted together in axial alignment and rigidly connected by equiangularly disposed screws 34. Fluid tight relationship between flanges 26 and 32 is maintained by an O-ring type sealing element 36 retained in an annular recess in the face of flange 26 abutting flange 32. The internal diameter of tubular members 22 and 28 is preferably equal to that of the conduit in which the meter 20 is interposed for fluid flow measuring purposes.

A suitably faired core structure, consisting of an upstream unit 38 and a downstream unit 40, is mounted within the tubular members 22 and 28 in coaxial alignment therewith and houses the fluid metering structure and register drive mechanism.

Core unit 38 comprises a hollow body member 42 having an end recess 44 receiving a bearing support 46 in axial alignment therewith and fixed thereto by screws 48, a plate 50 rigidly secured at the opposite end of member 42 by screws 52 and a nose piece 54 rigidly mounted upon the plate 50 by a stud bolt 56. The exterior surface 58 of the nose piece 54 is of suitable diverging cross-section in the direction of flow to convert the flow of gas or other fluid being metered from the cylindrical stream of the conduit being metered into an annular stream in the annular channel 60 defined between the exterior cylindrical surface of core member 42 and the interior cylindrical surface of housing member 22. Core unit 38 is coaxially supported within the tubular member 22 by radially extending ribs 62 which are equiangularly spaced about the common axis of the core unit 38 and tubular member 22 and which are rigidly connected to core member 42 by screws 64 and rigidly fixed to tubular member 22 by screws 66.

The downstream core unit 40 is formed by a hollow member 68 and the exterior surface 70 of which converges in the direction of fluid flow from a cylindrical portion 72 coaxial with and of equal diameter to the exterior surface of the member 42 to a tip 74 and is of suitable curvature to restore the pattern of fluid flow from the annular channel 60 to the cylindrical channel of the downstream pipe with minimum turbulence. Member 68 is coaxially supported within the tubular member 28 by equiangularly spaced pairs of studs 76 and 78 which are threaded into the member 68 and by screws 80 which extend through the wall of the tubular member 28 and are threaded into the ends of the studs 76 and 78. A plate 82, apertured at 84, is mounted upon the end of member 68 adjacent the core unit 38 and supports a thrust bearing retainer 86.

The meter rotor assembly 88 consists of a shaft 90 formed of magnetic material journalled upon the member 46 by spaced radial bearings 92 and 94 and magnetically suspended by a permanent horseshoe magnet 96 mounted in the member 46 above the shaft 90, a rotor wheel 98 terminating in equiangularly spaced turbine blades 100 at the periphery thereof disposed within the annular channel 60, and a permanent magnet type magnetic drive coupling driving element 102 fixed to the opposite end of shaft 90 exteriorly of the bearing 92. The resultant magnetic force of magnet 96 is of such magnitude as to counterbalance the weight of the rotor assembly 88, and its line of action being through the center of gravity of assembly 88. The total weight of assembly 88 in one practical embodiment of the invention is 0.16 lb. and its moment of inertia is 0.50 lb. in.²

There should be sufficient gap between the magnet 96 and shaft 90 so that unavoidable radial play of shaft 90 in bearings 92 and 94 does not change the magnetic force appreciably.

The turbine wheel 98 of the rotor 88 is disposed between the core units 38 and 40 at the juncture of flanges 26 and 32 on housing members 22 and 28 and is readily accessible for servicing by removal of the tubular member 28 together with the core unit 40 mounted therein after detachment of the flanges 26 and 32. With the tubular member 28 and core unit 40 thus removed, the entire rotor assembly can be removed as a unit by removing screws 48 to detach the bearing support 46 from the core member 42.

Thrust force of the rotor 88 is absorbed by a jewel bearing mounted on plug 104 which is resiliently backed by a compression spring 106 and mounted in the member 86 of the core unit 40 in axial alignment with the rotor assembly 88. The resilient support of this bearing prevents damage thereto during shipment.

Figure 4:
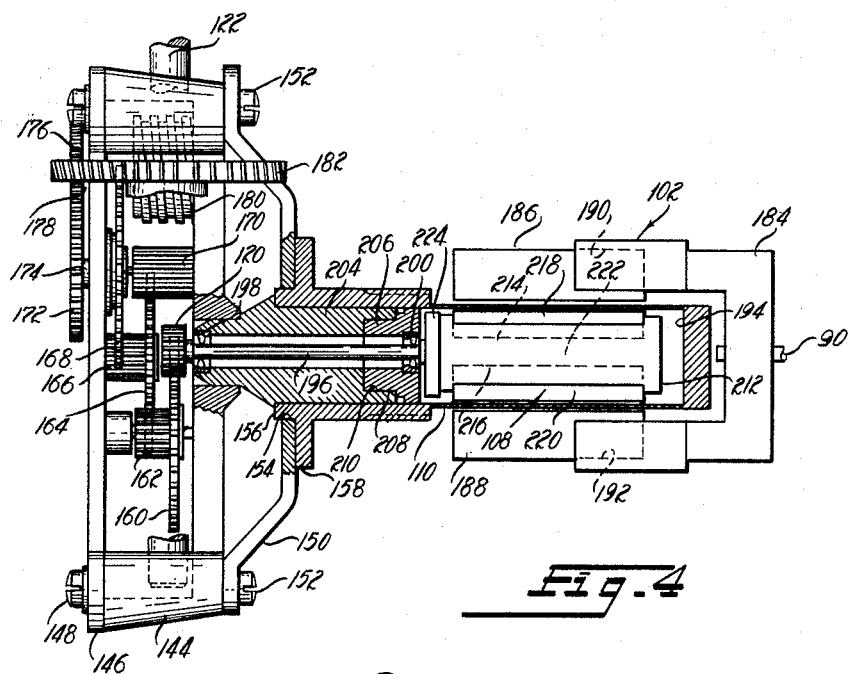
FIGURE 4 is an enlarged partially sectioned fragmentary view of the magnetic coupling and gear train of the register drive.
Figure 5:
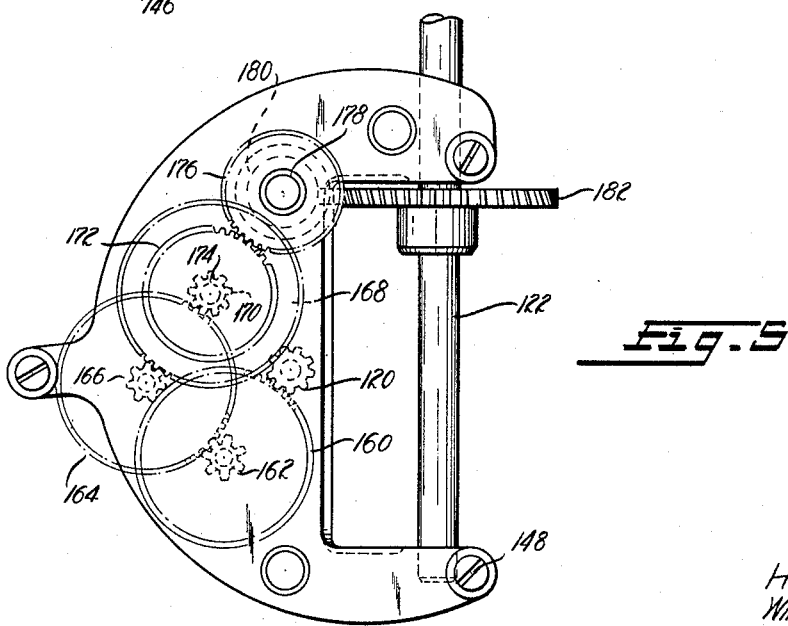
FIGURE 5 is a left end view of the mechanism illustrated in FIGURE 4.

As will be explained in greater detail presently, the magnetic driving element 102 is magnetically coupled to a magnetic follower element 108 through a non-magnetic tubular partition 110 forming a static fluid seal and which is mounted in fluid tight relation with the member 42 by a support plate 112 which is fixed to the member 42 by screws 114 and which is maintained in fluid tight relation therewith by an O-ring 116 recessed in member 42 and with tubular partition 110 by an O-ring 118 recessed in plate 112. The follower element 108 drives a pinion 120 which through a suitable gear train, as shown in FIGURES 4 and 5, is coupled to a vertically extending shaft 122 which, as is most clearly shown in FIGURE 3, is coaxially aligned with and coupled to a register drive shaft 124. Register drive shaft 124 (FIGURE 3) extends through a fixed tubular housing 126. Housing 126 extends through the annular channel 60 between members 22 and 42, being fixed to member 42 by an insert plug 128 which, in assembly, becomes substantially an integral part of member 42. Static fluid tight relation between housing 126 and plug 128 is established by an O-ring 130. Housing 126 is mounted on member 22 by an insert member 132 welded to member 22. O-ring 134 forms a static fluid tight seal betwen housing 126 and insert 132.

The shaft 124 is coupled to an input shaft 136 of a conventional dial type indicator 138 (FIGURES 1 and 3) which is mounted upon the top of the meter 20 within an upstanding tubular housing 140 rigidly fixed in substantial radial relation to the exterior of the tubular member 22.

Referring now to FIGURES 4 and 5, the gear train between pinion 120 and shaft 122 is mounted on a pair of supports 144 and 146 which are rigidly connected by screws 148 and which are mounted upon the integral extension of the tubular partition 110 by a bracket 150. Bracket 150 is rigidly connected by screws 152 to the member 144 and is provided with a central aperture 154 in which is received in a piloting fit the cylindrical portion 156 of the tubular partition 110, the bracket 150 being in abutment with a radially extending flange 158 on tubular partition 110. The fit between aperture 154 and cylindrical portion 156 may either be a force fit or the elements may be brazed together to form a rigid assembly.

The gear train between pinion 120 and shaft 122 consists of a gear 160 journalled on member 144 in constant mesh with pinion 120, a pinion 162 rigidly coaxially fixed to the gear 160, a gear 164 journalled on the member 144 in constant mesh with the pinion 162, a pinion 166 rigidly coaxially fixed to the gear 164, a gear 168 journalled upon a boss 170 integral with the member 144 in constant mesh with the pinion 166, a gear 172 connected through member 146 by a shaft 174 for unitary coaxial rotation with gear 168, a gear 176 journalled on the plate 144 and 146 by a shaft 178 in constant mesh with the gear 172, a worm gear 180 fixed on the shaft 178, and a worm wheel 182 fixed on the shaft 122 and in constant mesh with the worm gear 180.

Structurally the magnetic drive coupling driving element 102 consists of a stainless steel yoke 184 coaxially fixed to the shaft 90 and a pair of square bar magnets 186 and 188 fixed in recesses 190 and 192 on the arms of the yoke 184 as by soft soldering. The axes of the square bar magnets 186 and 188 are equally spaced from the axis of the shaft 90 and parallel thereto and are disposed in surrounding relation to the tubular partition 110.

The follower magnet assembly is disposed within the closed end tubular well 194 of the tubular partition 110 and is mounted therein for coaxial rotation by a shaft 196 which is journalled in spaced bearings 198 and 200 which are supported by mating tubular bearing retainer members 204 and 206 respectively. Members 204 and 206 are maintained in coaxial alignment by the piloting engagement of the cylindrical surface 208 on member 206 with the cylindrical recess 210 in member 204 and are received in a piloting fit with the internal cylindrical wall of the tubular partition 110. Follower member 108 comprises a cylindrical plastic magnet support 212 having diametrially opposed semi-cylindrical recesses 214 and 216 cut in the periphery thereof to receive cylindrical follower magnets 218 and 220 respectively. Magnets 218 and 220 are preferably substantially coextensive in length with the driving magnets 186 and 188 and are maintained in alignment along the common axis of shafts 90 and 196 by the magnetic attraction of driving magnets 186 and 188, there being sufficient axial play in bearings 198 and 200 to accommodate any axial movement of follower 108 necessary to relieve these bearings of any axial load due to the magnetic coupling force of magnets 186 and 218 or magnets 188 and 220. The plastic magnet support 212 is fixed to the shaft 196 for rotation therewith by a pair of support pins indicated at 222. Pins 222 are received in apertures which are formed in plastic magnet support 212 and which are angularly offset from the recesses 214 and 216. The axes of pins 222 extend parallel to the axis of shaft 196. Pins 222 are supported at their free end by a flange 224 which is rigidly fixed coaxially to the shaft 196 to the right of the bearing 200.

As will be explained in greater detail presently, the relation between the driving magnets 186 and 188 and the follower magnets 218 and 220 is such that, as the shaft 90 is rotated in response to fluid flow through the turbine blades 100 of the rotor assembly 88, the follower assembly 108 will be caused to rotate either by attraction of the follower magnets 218 and 220 to the driving magnets 186 and 188 or by repulsion of the follower magnets 218 and 220 from the driving magnets 186 and 188. Rotation of the follower 108 imparts rotation to the shaft 196 and the pinion 120 which is fixed to the end thereof exteriorly of the bearing 198 to impart rotation to the register drive shaft 122 through the gear train illustrated in FIGURES 4 and 5 and previously described.

From the foregoing description, it is apparent from FIGURE 2, that the plate 50, seal 51, member 42, plate 112, seals 116 and 118 and tubular partition 110 define a sealed chamber 230 which is isolated from the fluid flowing through the channel 60 by the tubular shaft support 126 (FIG. 3) which is provided with seals 130 and 134 the rotary motion of the follower 108 is transmitted to the register mechanism 138 exteriorly of the meter housing members 22 and 28 without the use of any dynamic fluid seals such as stuffing boxes and thus provide a fluid tight register assembly.

FIGURES 6 and 7 illustrate an embodiment of the invention in the form of a double attraction type radial gap permanent magnetic coupling—hereinafter referred to as "double attraction" type magnetic coupling.

Permanent magnetic couplings may be broadly classified into two groups: those in which an axial flux gap is provided between magnetically attracted driving and driven members (hereinafter referred to as axial gap magnetic couplings and examples of which are illustrated in United States Patents No. 957,082 issued May 3, 1910 to L. H. Nash for Meter Register, No. 2,354,563 issued July 25, 1944 to F. W. E. Weisse for Magnetic Drive, and No. 2,399,856 issued May 7, 1946 to A. L. Coger for Magnetic Meter Drive) and those on which a radial flux gap is provided between the magnetic driving and driven members (hereinafter referred to as radial gap magnetic couplings and examples of which are illustrated in United States Patents No. 2,280,322 issued June 26, 1883 to L. H. Nash for Fluid Meter, No. 2,529,481 issued November 14, 1950 to J. C. Brewer for Fluid Rate of Flow Indicator and No. 2,566,220 issued August 28, 1951 to A. B. Lindley et al. for Water Meter).

In axial gap couplings, there exists an axial attractive force of large magnitude between the driving and driven members which cannot be cancelled but must be absorbed by a thrust bearing. The backload upon the metering element due to this axial component of magnetic coupling force is of such magnitude that it renders this type of coupling unsuitable to be used in fluid meters where no appreciable friction load can be tolerated, e.g. turbine meters. However, in radial gap couplings, non-driving forces may be minimized by symmetrical arrangement of the driving and driven members or, reduced by the use of rolling contact as shown for example in the aforesaid Bergman patent.

The magnetic couplings of the present invention are of radial gap type where all non-driving forces are substantially cancelled out by special symmetrical arrangement of the driving and driven members.

In the embodiment of the invention illustrated in FIGURES 6 and 7, the two driving magnets 186' and 188' are oppositely polarized in the direction of the axis of rotation of the driving magnet assembly 102' and the driven magnets 218' and 220' are also oppositely polarized so that the driven magnet 218' is magnetically attracted by the driving magnet 186' and repelled by the driving magnet 188'; the second driven magnet 220' is similarly attracted by magnet 188' and repelled by magnet 186'. It is seen that the total magnetic driving torque is the sum of the four above mentioned interactions.

Referring to FIGURE 7, $\theta$=the angle of lag of the follower 108' relative to the driver 102'.

$m$=the pole strength of each of the driver magnets 186' and 188'.

$m'$=the pole strength of each of the follower magnets 218' and 220'.

$r$=the radius of rotation of the center of the follower magnets 218' and 220' about the axis of shaft 196'.

$R$=the radius of rotation of the center of the driver magnets 186' and 188' about the axis of shaft 90'.

$\mu$=the permeability of the medium.

It follows, therefore, that for the structure of FIGURES 6 and 7 the approximate theoretical magnetic driving torque ($Tm$) is expressed by the equation:

$$Tm = 2\left\{\left[\frac{2mm'}{\mu} \frac{Rr \sin \theta}{(R^2+r^2-2Rr \cos \theta)^{3/2}}\right] + \left[\frac{2mm'}{\mu} \frac{Rr \sin (\pi-\theta)}{[(R^2+r^2-2Rr \cos (\pi-\theta)]^{3/2}}\right]\right\}$$

This equation is plotted by the curve 300 in FIGURE 8 for variations of $\theta$ between 0 and $\pi$. $Tm$ is the sum of four constituent torques: (1) the torque resulting from the attraction between magnets 218′ and 186′, $$\left[\frac{2mm'}{\mu} \frac{Rr \sin \theta}{(R^2+r^2-2Rr \cos \theta)^{3/2}}\right]$$

curve 302, (2) the torque resulting from the repulsion between magnets 218′ and 188′, $$\left[\frac{2mm'}{\mu} \frac{Rr \sin (\pi-\theta)}{[R^2+r^2-2Rr \cos (\pi-\theta)]^{3/2}}\right]$$

curve 304, (3) the torque resulting from the attraction between magnets 220′ and 188′ (same magnitude as 1), and (4) the torque resulting from the repulsion between magnets 220′ and 186′ (same magnitude as 2). Curve 306 represents the sum of 1 and 2 or 3 and 4 and curve 300 represents the sum of 1, 2, 3 and 4.

The maximum value of $Tm$, $(Tm)$ max., is also the maximum value of total steady torque which the magnetic drive can transmit and can be shown analytically that it is approximately 2.3 times $(Tm)$ max. for a comparable drive utilizing but a single driver and a single follower magnet as in the aforesaid Bergman patent which is hereinafter referred to as "single attraction" type magnetic coupling. However, the useful output torque of the double attraction type (FIGURES 6 and 7) can be even considerably greater than 2.3 times that of the single attraction type due to the fact that the latter possesses large back load caused by dynamical and magnetical unbalances.

The theoretical value of the total magnetic potential energy available, $(V_T)$, is represented by the area under the curve OBB′DO. That is:

$$V_T = \int_0^\pi Tm\, d\theta$$

which, for the structure of FIGURES 6 and 7, means $$V_T = 4\left\{\frac{2mm'}{\mu}\left(\frac{1}{(R-r)} - \frac{1}{(R+r)}\right)\right\}$$

This is four times the theoretical total magnetic potential energy available in a comparable drive of the single attraction type.

The total instantaneous resisting torque present at the follower side of the drive $(Tr)_F$ is the sum of three components:

$Tg$ = Register frictional torque (Generally increases with speed)

$(Tc)_F$ = Resisting torque due to the unbalanced centrifugal action of the follower. (Increases with the square of the follower speed)

$(Tn)_F$ = Resisting torque due to the unbalanced radial component of the magnetic coupling force acting upon the follower by the driver (a function of $\theta$).

Therefore:

$$(Tr)_F = Tg + (Tc)_F + (Tn)_F$$

While in a drive such as that of the single attraction type, $(Tc)_F$ and $(Tn)_F$ are both relatively large due to the dynamically and magnetically unbalanced structure, in a drive of the type of FIGURES 6 and 7, both are small as the coupling is balanced both magnetically and dynamically within manufacturing tolerances.

$(Tr)_F$ for the coupling of FIGURES 6 and 7 is illustrated in FIGURE 9 in relation to $Tm$. FIGURE 10 is a plot similar to FIGURE 9 but for a comparable drive of the single attraction type.

From FIGURE 9 it is apparent that for any angle $\theta$, the difference between $Tm$ and $(Tr)_F$, $[Tm-(Tr)_F]$, is the torque available for accelerating the follower system. Thus with the driver and follower both moving at a constant speed, the driving magnets 186′ and 188′ will lead the driven magnets 218′ and 220′ by an angle $\theta_A$ corresponding to the point A, the torque required being only that to overcome $(Tr)_F$. When the follower magnets 218′ and 220′ are accelerated, the angle $\theta$ will increase, thereby increasing the torque $[Tm-(Tr)_F]$ available for accelerating the follower magnets 218′ and 220′ and as the angular velocity of magnets 218′ and 220′ approach the new steady angular velocity of the magnets 186′ and 188′, the angle $\theta$ will gradually decrease toward the angle $\theta_A$ corresponding to point A as the torque requirements decrease.

A comparison of the curve of $Tm$ of FIGURE 9 with that of FIGURE 10 (or the curve 302 of FIGURE 8), illustrates clearly that the present drive of FIGURES 6 and 7 has, over its entire range from 0 to $\pi$, a much greater theoretically available driving torque $Tm$. This is particularly significant in the range of $\theta$ between $\pi/2$ and $\pi$.

In reference to FIGURE 9, the maximum energy $(Ea)_{max}$ available to accelerate the follower system is equal to the difference between the maximum useful magnetic potential energy and work done against the total resisting torque $(Tr)_F$ of the follower system, or $$(Ea)_{max} = \int_{\theta_A}^{\theta_C} Tm\, d\theta - \int_{\theta_A}^{\theta_C} (Tr)_F\, d\theta = \int_{\theta_A}^{\theta_C} [Tm-(Tr)_F]\, d\theta$$

where $\theta_A$ and $\theta_C$ are the two values of $\theta$ at which $Tm = (Tr)_F$. Graphically, $(Ea)_{max}$ is shown by the single hatched area ABB′CA in FIGURE 9 for double attraction type or area ABCA in FIGURE 10 for single attraction type. Since both the accelerating torque $[Tm-(Tr)_F]$ and useful angular displacement $(\theta_C-\theta_A)$ for acceleration are considerably larger for double attraction type than for single attraction type, the double attraction type magnetic coupling has much more maximum energy $(Ea)_{max}$ available for pick up of the follower system than the single attraction type of comparable size.

It can be shown that the energy required to accelerate the follower system from zero speed to a constant steady speed $\omega$ of the driver is equal to the kinetic energy $\frac{1}{2}I\omega^2$ gained by the follower system during acceleration where $I$ is the effective moment of inertia of the follower system referring to the axis of rotation of the follower magnets. Analysis also reveals that the maximum speed $\Omega$ at which the driver, running at constant speed $\Omega$, can pick up the follower system from rest is given by the condition that the kinetic energy $\frac{1}{2}I\Omega^2$ gained by the follower system during the acceleration from zero speed to speed $\Omega$ equals $(Ea)_{max}$ which is the difference between the maximum useful magnetic potential energy and work done against the total resisting torque $(Tr)_F$ of the follower system.

Mathematically, $$1/2 I\Omega^2 = (Ea)_{max} = \int_{\theta_A}^{\theta_C} [Tm-(Tr)_F]\, d\theta$$

The effective moment of inertia $I$ of the follower system of a double attraction type is only slightly greater than that of an equivalent single attraction type while the maximum energy $(Ea)_{max}$ available for pick up is much greater for the former than for the latter as previously discussed. The above equation indicates that the double attraction type of magnetic coupling should have a considerably higher pick up speed than the single attraction type of same size. In actual tests of one practical embodiment of the drive of FIGURES 6 and 7 used in connection with the turbine meter shown in FIGURE 2, this double attraction type of magnetic coupling has an actual maximum pick up speed of 5800 r.p.m., that is the maximum driver speed at which the driver can pick up the follower system from rest is 5800 r.p.m. A corresponding single attraction type (Bergman drive) of identical size is found to have a maximum pick up speed of 1850 r.p.m.

Considering the backload "$T_b$" of the magnetic coupling upon the metering element, $T_b$ consists of:

(1) Resisting torque "$T_c$" due to the unbalanced centrifugal action of the members of the magnetic coupling—proportional to the square of the running speed, (2) Resisting torque "$(Tn)_F$" due to the unbalanced radial component of the magnetic coupling forces acting upon the follower magnets by the driver magnets—a function of $\theta$ (FIGURE 11), and (3) Resisting torque "$(Tn)_D$" due to the unbalanced radial component of the magnetic coupling forces acting upon the driver magnets by the follower magnets—a function of $\theta$ (FIGURE 12).

Or $$T_b = T_c + (Tn)_F + (Tn)_D$$

Since the double attraction type is supposed to be both dynamically and magnetically balanced whereas the single attraction type is not, the values of $T_c$, $(Tn)_F$ and $(Tn)_D$ should be much smaller for double attraction type than for single attraction type. Actual testing result of the two practical embodiments of magnetic coupling mentioned in the previous paragraph shows that the backload $T_b$ upon the metering element is $3.5 \times 10^{-4}$ inch-pound for the double attraction type and $32.0 \times 10^{-4}$ inch-pound for the single attraction type.

With continued reference to the double attraction type of FIGURES 6 and 7, the value of backload $T_b$ will be negligibly small only for an ideal perfect drive which has equal pole strength of the two follower magnets and of the two driver magnets, exactly matched dimensions and concentricity of the structure. However, in a practical commercial model, it must be accepted that these ideal conditions can never be expected. The double attraction type of magnetic coupling will have some appreciable backload, the exact magnitude of which depends upon the amount of deviation from above mentioned ideal conditions. For given amount of magnetic unbalance, the values of $(Tn)_F$ and $(Tn)_D$ depend upon the angular displacement $\theta$ between driver magnet and its corresponding follower magnet. The functional relationships between $Tn$ and $\theta$ and between $(Tn)_D$ and $\theta$ are plotted in FIGURES 11 and 12 respectively. It is seen in FIGURE 11 that $(Tn)_F$ is maximum at $\theta=0$, decreases first slowly, then quickly, to zero (this occurs in the neighborhood of $\theta=70°$ when the magnetic coupling forces acting on the follower magnets are purely tangential in direction and have no radial components), and finally increase slowly throughout the rest values of $\theta$. FIGURE 12 indicates that $(Tn)_D$ has its maximum value at $\theta=0$, decreases first slowly then quickly and finally very slowly. In normal steady running state of the double attraction type of magnetic coupling (FIGURES 6 and 7) the angular displacement $\theta$ between the driver and the follower is small, $0 < \theta < 20°$ in most applications in either positive displacement meters or turbine meters. Corresponding to these small values of $\theta$, both the resisting torques $(Tn)_F$ and $(Tn)_D$ due to the given amount of magnetic unbalance are comparatively large resulting in backload of appreciable magnitude. For meters where backload of the magnetic coupling upon the metering element is critical, such as turbine gas meters, the backload of the double attraction type may prove to be still not low enough to insure high accuracy at low flow rates. Under these conditions, the "double repulsion" type of magnetic coupling (FIGURES 13 and 14) which has practically minimum backload will give best results at some sacrifice in maximum torque transmitted and maximum pick-up speed. However, the double attraction type is the best type of magnetic coupling for meters where moderate backload can be tolerated but high torque transmission, high acceleration and high pick-up speed are required.

Referring now to FIGURES 13 and 14, the magnetic coupling therein illustrated is structurally identical to that shown in FIGURES 6 and 7. The basic difference resides in the fact that the magnets 186″ and 188″ of the driver are so polarized relative to the magnets 218″ and 220″ of the follower that the follower magnets 218″ and 220″ are both repelled by the driver magnets 186″ and 188″. A magnetic coupling of this type is hereinafter referred to as "double repulsion" type.

Referring now to FIGURE 15, the approximate theoretical value of the magnetic driving torque $$Tm = 2 \left\{ \frac{(2mm'Rr \sin \theta)}{\mu(R^2+r^2-2Rr \cos \theta)^{3/2}} - \frac{(2mm'[Rr \sin (\pi-\theta)])}{\mu[R^2+r^2-2Rr \cos (\pi-\theta)]^{3/2}} \right\}$$

The net magnetic driving torque $Tm$ as shown by curve 300′ FIG. 15 is the difference between the two driving torques due to repelling forces between magnets 186″ and 218″ and between magnets 188″ and 220″ (each is equal to $$\left[ \frac{2mm'Rr \sin \theta}{\mu(R^2+r^2-2Rr \cos \theta)^{3/2}} \right]$$

and plotted as curve 302′ in FIGURE 15) and the two opposing torques due to repelling forces between magnets 188″ and 218″ and between magnets 186″ and 220″ (each is equal to $$\left[ \frac{2mm'}{\mu} \frac{Rr \sin (\pi-\theta)}{(R^2+r^2-2Rr \cos (\pi-\theta))^{3/2}} \right]$$

and plotted as curve 304′ in FIGURE 15). An evaluation of the mathematical expressions for $Tm$ indicates that the maximum magnetic driving torque $(Tm)_{max}$ of the double repulsion type is about 0.74 times that of the corresponding double attraction type (but still 1.7 times that of the corresponding single attraction type). It also shows that the total angular displacement $\theta$ available for driving is 90° for double repulsion type against 180° for double attraction type. These reductions in values of $(Tm)_{max}$ and useful range of $\theta$ for the double repulsion type are due to the counter-acting effect of the constituents of magnetic coupling forces.

In reference to FIGURE 16 of double repulsion type, the maximum energy available to accelerate the follower system $$(Ea)_{max} = \int_{\theta_A}^{\theta_C} [Tm - (Tr)_F] d\theta$$

and is shown by the single hatched area ABCA. $(Ea)_{max}$ of double repulsion type is smaller than that of its corresponding double attraction type because of its somewhat smaller values of accelerating torque $[Tm - (Tr)_F]$ and useful angular displacement $(\theta_C - \theta_A)$. Since the moment of inertia I of the follower system is the same for a double repulsion type as its corresponding double attraction type, the former will have somewhat less maximum pick-up speed $\Omega$ than the latter because $\frac{1}{2} I\Omega^2 = (Ea)_{max}$. However, the maximum pick-up for the double repulsion type is still considerably higher than that of the corresponding single attraction type. In a drive of the double repulsion type shown in FIGURES 13 and 14 which in all respects other than magnet polarity was identical to the physical embodiment of the double attraction type of FIGURES 6 and 7 referred to in a previous paragraph the maximum pick-up speed was 3900 r.p.m. (as against 5800 r.p.m. for double attraction type and 1850 r.p.m. for single attraction type).

At the normal steady state driving condition of a double repulsion type of magnetic coupling, the angle $\theta$ between the driver magnet and follower magnet is usually only slightly less than 90° as shown by $\theta_A$ FIGURE 16 (in practice $70° < \theta_A < 90°$). Referring to FIGURES 11 and 12, the sum of the resisting torques $(Tn)_F$ and $(Tn)_D$ due to a given amount of magnetic unbalance is practically minimum for these values of $\theta$, resulting in minimum backload upon the metering element. The reason for this is due to the fact that the magnetic coupling forces are essentially tangential and have no radial components of appreciable magnitude for steady state driving of the double repulsion type. Acutal testing data of the physical embodiment of a double repulsion type referred to in the preceding paragraph shows that its total backload upon the metering element is only $0.42 \times 10^{-4}$ inch-pound against $3.5 \times 10^{-4}$ inch-pound for double attraction type and $32.0 \times 10^{-4}$ inch-pound for single attraction type.

It can be then concluded that the double attraction type of magnetic coupling as shown in FIGURES 6 and 7 are most suitable to meters where high torque transmission, high acceleration and high pick-up speed are required while moderate amount of backload upon metering element can be tolerated, such as in the operations of positive displacement meters, turbine liquid meters etc. Double repulsion type of FIGURES 13 and 14 are most suited to meters which no backload of appreciable magnitude can be tolerated such as turbine gas meters, turbine liquid meters of small sizes etc.

From the foregoing, it is apparent that the present invention provides a greatly improved register drive train and magnetic coupling therefor.

FIGURES 8, 9, 10, 15 and 16 are all drawn to the same scale to facilitate comparison.

The invention may be embodied in other specific forms without departing from the spirit or essential characteristics thereof, the present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In coupling assembly, a pair of coaxially rotatably mounted members and means for establishing a magnetic coupling torque effective to drive couple said members together consisting of only a pair of first uniformly circumferentially spaced similarly axially polarized permanent magnets mounted for rotation with one of said members in a longitudinally aligned annular path, and a pair of second axially polarized uniformly circumferentially spaced permanent magnets polarized similarly relative to said first magnets and mounted for rotation with the other of said members about a longitudinally aligned annular path concentrically within the annular path of said first magnets.

2. In a coupling assembly, a pair of coaxially rotatably mounted members and means for establishing a magnetic coupling torque effective to drive couple said members together consisting of only a pair of first uniformly circumferentially spaced reversely axially polarized permanent magnets mounted for rotation with one of said members in a longitudinally aligned annular path, and a pair of second uniformly circumferentially spaced reversedly axially polarized permanent magnets mounted for rotation with the other of said members about a longitudinally aligned annular path concentrically within the annular path of said first magnets.

3. In a fluid meter having a metering element rotatable in response to fluid flow, a meter register capable of manifesting the number of turns of said metering element and a fluid meter register drive train coupling said metering element with said meter register to actuate said meter register in response to rotation of said metering element, said fluid meter register drive train comprising a magnetic coupling having input and output axially polarized magnetic members mounted to revolve about a common axis in substantially concentric inner and outer annular paths with the poles of said magnetic members extending parallel to said comon axis and providing magnetic fields to establish a magnetic coupling torque effective to drive couple said members, said input member and said output member adapted to be respectively mechanically coupled to said metering element and said meter register and bearing means providing a predetermined limited free axial movement of one of said members relative to the other of said members to permit said member that is axially movable to center and align itself longitudinally at its rotation axis with respect to the other of said members solely by the magnetic interaction therebetween.

4. The fluid meter as defined in claim 3 wherein said members are independently coaxially mounted for rotation and wherein each of said members are provided with permanent magnets having coaxial uniformly spaced apart reversely polarized magnetic poles.

5. The fluid meter defined in claim 3 wherein said bearing means coaxially mounts said metering element and said input member.

6. In a fluid meter having a housing providing a fluid passage therethrough, a metering element movable in response to fluid flow through said passage and a meter register, a fluid meter register drive train coupling said metering element to said meter register to actuate said meter register in response to movement of said metering element, said fluid meter register drive train comprising: a pair of axially spaced coaxial shafts, a fluid tight partition having a tubular portion of non-magnetic material coaxial with said shafts and terminating in an end wall interposed between the ends of said shafts, a magnetic coupling drive connecting said shafts comprising a plurality of permanent bar magnets mounted on one of said shafts in symmetrical angularly spaced relation about the axis of said shaft for movement in an annular path surrounding said tubular partition and a plurality of permanent bar magnets mounted on the other of said shafts in symmetrical angularly spaced relation about the axis of said other shaft for movement concentrically with the magnets of said one shaft in an annular path within said tubular partition, said magnets being polarized parallel to the axis of rotation and the magnetic fields of said magnets interacting through said partition to establish a magnetic coupling torque effective to drive couple said shafts, at least one of said magnets on said other shaft having a polarity to oppose the selected rotation of said one shaft whereby the relative rotative position of said magnets on said one shaft with respect to said magnets on said other shaft is influenced before the driving force of said magnets on said one shaft becomes drivingly noneffective with respect to the magnets on the said other shaft, said one shaft being formed of magnetic material and means for magnetically suspending said one shaft.

7. The combination defined in claim 6, wherein the axis of said one shaft is substantially horizontal in the normal operative position of said meter and wherein said magnetic suspending means comprises a magnet so disposed above said one shaft that the line of action of the resultant magnetic attractive force between said magnet and said one shaft passes vertically through the resultant center of gravity of said one shaft and the components mounted thereon.

8. The combination defined in claim 7, wherein said magnet is so spaced from said one shaft by a non magnetic gap that slight radial play of said one shaft is immaterial to the magnitude of the force of attraction between said magnet and said one shaft.

9. In a fluid meter having a metering element rotatable in response to fluid flow, a meter register capable of manifesting the number of turns of said metering element and a fluid register drive train coupling said metering element with said meter register to activate said meter register in response to rotation of said metering element, said drive train having a magnetic coupling comprising drive and driven magnets, means mounting said drive and driven magnets in parallel relation to revolve about a common axis in substantially concentric inner and outer annular paths with each of said magnets having oppositely polarized poles disposed at opposite ends thereof along a common axis extending in parallel spaced apart relation to the common axis of said annular paths, said drive magnet being driven by said metering element while said driven magnet will normally move along its path under the influence of magnetic force acting between said drive and driven magnets, and means including a magnetic piece mounted in fixed circumferentially spaced parallel relation to said driven magnet for movement in the same path as said driven magnet and having oppositely polarized poles disposed at opposite ends thereof along an axis extending parallel to said common axis of said annular paths, said magnetic piece being so polarized and disposed as to establish a repulsion force between it and said drive magnet.

10. In a fluid meter having a metering element rotatable in response to fluid flow, a meter register capable of manifesting the number of turns of said metering element and a fluid register drive train coupling said metering element with said meter register to activate said meter register in response to rotation of said metering element, said drive train having a magnetic coupling comprising drive and driven members, means mounting said members for rotation about a common axis, first and second magnets respectively mounted on said drive and driven members in parallel relation to revolve about said common axis in substantially concentric inner and outer annular paths with each of said magnets having oppositely polarized poles disposed at opposite ends thereof along a common axis extending in parallel spaced apart relation to the common axis of said annular paths to magnetically couple said drive and driven members, means including a third magnet mounted in fixed circumferentially spaced parallel relation to said second magnet for movement in the same path as said second magnet and having oppositely polarized poles disposed at opposite ends thereof along an axis extending parallel to said common axis, said third magnet being so polarized and disposed as to establish a repulsion force between it and said first magnet, and means establishing a magnetic force of attraction the resultant of which passes transversely of said common axis for counterbalancing the gravitational force acting on said drive member and said first magnet.

11. In a fluid meter having a metering element rotatable in response to fluid flow, a meter register capable of manifesting the number of turns of said metering element and a fluid register drive train coupling said metering element with said meter register to activate said register in response to rotation of said metering element, said drive train having a magnetic coupling comprising drive and driven members, means mounting said drive and driven members for rotation about a common axis, first and second magnets respectively mounted on said drive and driven members to revolve about said common axis in substantially concentric inner and outer annular paths with each of said magnets having oppositely polarized poles disposed at opposite ends thereof along an axis extending in parallel spaced apart relation to said common axis to magnetically couple said drive and driven members, and means including a magnetic piece mounted in fixed circumferentially spaced parallel relation to said second magnet for movement in the same path as said second magnet and being so polarized and disposed as to establish a repulsion force between it and said first magnet, said means for mounting said drive and driven members comprising bearing means providing a predetermined limited axial movement of one of said members relative to the other of said members to permit the magnet on said one of said members that is axially movable to center and align itself longitudinally at its rotation axis with respect to the magnet on the other of said members solely by the magnetic interaction therebetween.

12. In a fluid meter having a metering element rotatable in response to fluid flow, a meter register capable of manifesting the number of turns of said metering element and a fluid register drive train coupling said metering element with said meter register to activate said meter register in response to rotation of said metering element, said drive train having a magnetic coupling comprising a pair of drive and driven members, means mounting said members for rotation about a common axis and means for establishing a magnetic coupling torque effective to drive couple said members together comprising a pair of first uniformly circumferentially spaced similarly axially polarized permanent magnets mounted for rotation with one of said members in a longitudinal aligned annular path, and a pair of second axially polarized uniformly circumferential spaced permanent magnets polarized similarly relative to said first magnets and mounted for rotation with the other of said members about a longitudinally aligned annular path concentrically within the annular path of said first magnets.

13. In a fluid meter having a metering element rotatable in response to fluid flow, a meter register capable of manifesting the number of turns of said metering element and a fluid register drive train coupling said metering element with said meter register to activate said metering register in response to rotation of said metering element, said drive train having a magnetic coupling comprising a pair of drive and driven members, means axially mounting said members for rotation about a common axis, and means for establishing a magnetic coupling torque effective to drive couple said members together comprising a pair of first uniformly circumferentially spaced reversely axially polarized permanent magnets mounted for rotation with one of said members in a longitudinally aligned path, and a pair of second uniformly circumferentially spaced reversely axially polarized permanent magnets mounted for rotation with the other of said members about a longitudinally aligned annular path concentrically within the annular path of said first magnets.

References Cited in the file of this patent

UNITED STATES PATENTS

| | | |
|---|---|---|
| 1,696,132 | Wermeille | Dec. 18, 1928 |
| 2,436,939 | Schug | Mar. 2, 1948 |
| 2,437,871 | Wood | Mar. 16, 1948 |
| 2,449,973 | Bergman | Sept. 28, 1948 |
| 2,481,172 | Staggs | Sept. 6, 1949 |
| 2,705,762 | Pile | Apr. 5, 1955 |
| 2,713,261 | Butterworth et al. | July 19, 1955 |
| 2,770,131 | Sparling | Nov. 13, 1956 |
| 2,943,483 | Benson | July 5, 1960 |

FOREIGN PATENTS

| | | |
|---|---|---|
| 655,465 | France | Dec. 17, 1928 |
| 733,381 | Great Britain | July 13, 1955 |